United States Patent [19]

Pizzorno et al.

[11] Patent Number: 5,193,134
[45] Date of Patent: Mar. 9, 1993

[54] GROOVED-CORE CABLE FOR USE WITH RIBBON OPTICAL FIBRES AND PROCESS TO MAKE THE SAME

[75] Inventors: Massimo Pizzorno, Milan; Alessandro Ginocchio, Sesto S. Giovanni, both of Italy

[73] Assignee: Pirelli Cavi S.p.A., Milan, Italy

[21] Appl. No.: 834,005

[22] Filed: Feb. 11, 1992

[30] Foreign Application Priority Data

Mar. 8, 1991 [IT] Italy ............................ MI91A 000597
Mar. 8, 1991 [IT] Italy ............................ MI91A 000598

[51] Int. Cl.⁵ ............................ G02B 6/00; G02B 6/36
[52] U.S. Cl. ............................................ 385/105
[58] Field of Search ................ 385/100, 101, 102, 105

[56] References Cited

U.S. PATENT DOCUMENTS

| | | | |
|---|---|---|---|
| 4,199,224 | 4/1980 | Oestreich | 385/105 |
| 4,596,443 | 6/1986 | Diemeer et al. | 385/105 X |
| 4,690,498 | 9/1987 | Priaroggia | 385/105 X |
| 4,703,998 | 11/1987 | Uchioke et al. | 385/105 |
| 4,707,074 | 11/1987 | Heywood | 385/105 X |
| 4,767,184 | 8/1988 | Ogasawara et al. | 385/105 |
| 4,807,962 | 2/1989 | Arroyo et al. | 385/105 |
| 4,820,014 | 4/1989 | Nishimura et al. | 385/105 |
| 4,842,438 | 6/1989 | Bortolin et al. | 385/105 X |

FOREIGN PATENT DOCUMENTS

| | | |
|---|---|---|
| 21965 | 5/1985 | Australia . |
| 0194891 | 3/1986 | European Pat. Off. . |
| 0242775 | 4/1987 | European Pat. Off. . |
| 0280279 | 2/1988 | European Pat. Off. . |
| 0357139 | 8/1989 | European Pat. Off. . |
| 2449439 | 8/1984 | Fed. Rep. of Germany . |
| 2507583 | 8/1984 | Fed. Rep. of Germany . |
| 2428849 | 1/1980 | France . |

OTHER PUBLICATIONS

Hatano et al.: Int. Wire & Cable Symp. Proc. 1986, pp. 17-23 (no month).
Nirasawa et al.; Sumitomo Electric Tech. Review.n. 25, pp. 75-80, Jan. 1986.
Yamamura et al.; Joun. of Lightwave Techn.v.6, n. 12, pp. 1815-1820, Dec. 1988.
Esposto et al.; Int. Wire & Cable Sympos. Proc. '90, pp. 536-541 (no month).
Esposto et al.; Int. Wire & Cable Sympos. Proc. '91, pp. 749-757 (no month).
Donazzi et al.; 9 EFOC/LAN 91 Proceedings, pp. 116-121, Jun. 1991.

Primary Examiner—Akm E. Ullah
Attorney, Agent, or Firm—Brooks Haidt Haffner & Delahunty

[57] ABSTRACT

The described ribbon optical fibre cable comprises a cylindrical core (9) provided, on the outer surface thereof, with parallel grooves (10) extending in a helical manner along the cable axis, at least a pair of ribbons (1) being radially superposed within at least one of said grooves (10). Each ribbon (1a, 1b, 1c, 1d, 1e) comprises a plurality of optical fibres (2) each of which is covered with a primary layered coating (3), and a common coating (4) covers all the optical fibres of the ribbon. The primary coating (3) is formed with a first layer (5) directly in contact with the fibres (2) and a second layer (6) external to the first layer (5), the modulus of elasticity of said first layer (5) being lower than the modulus of elasticity of said second layer (6). Applied to each ribbon (1a, 1b, 1c, 1d, 1e) is a longitudinal tension greater than the longitudinal tension applied to the ribbon radially overlying the former. The process for making this ribbon optical fibre cable provides for the ribbons (1) being laid into the grooves by applying to each ribbon (1a, 1b, 1c, 1d, 1e) a longitudinal tension greater than the longitudinal tension applied to the ribbon radially superposed thereto.

29 Claims, 2 Drawing Sheets

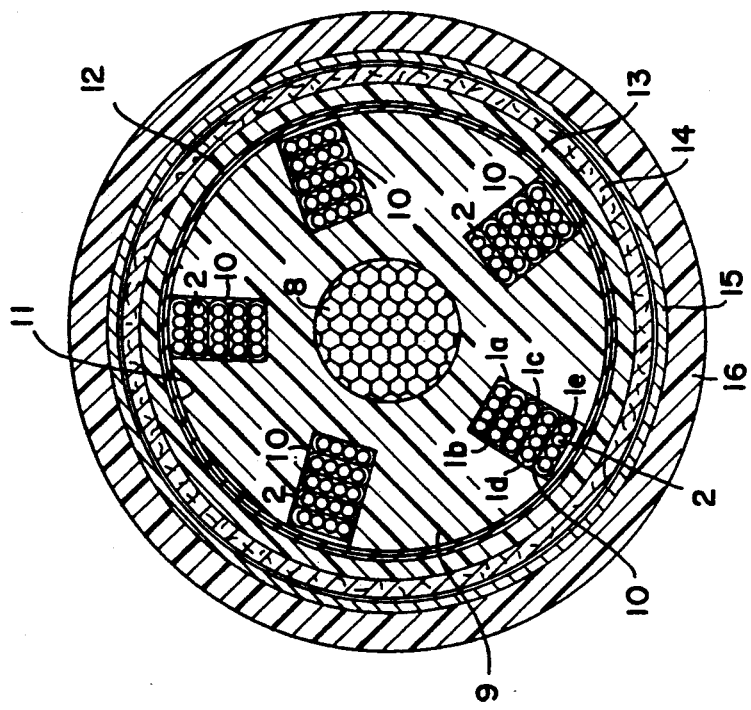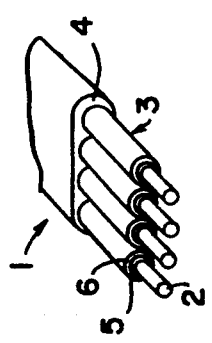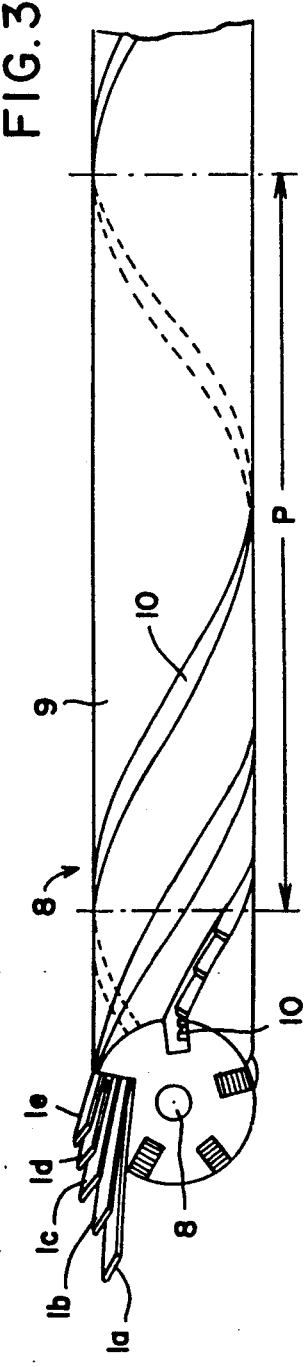

GROOVED-CORE CABLE FOR USE WITH RIBBON OPTICAL FIBRES AND PROCESS TO MAKE THE SAME

The present invention relates to a cable for use with ribbon optical fibres in which the optical fibre ribbons are housed within a grooved core, and the process to make the same.

It is known that optical fibre cables are becoming increasingly more used for transmitting information, for example in telephone communication field.

One of these cables is described in German Patent No. 25 07 583, which is a completive patent of German Patent No. 24 49 439.

This cable comprises a strength member formed with steel wires, adapted to withstand the stresses to which the cable is submitted and around which a cylindrical core is integrally disposed, which core is provided, on the outer surface thereof, with parallel grooves extending in a helical manner relative to the axis of the cable.

Optical fibre bundles or ribbons are housed in each of said grooves and a number of wrappings are disposed around the core.

The sizes in section of the fibre ribbons housed in each groove are smaller than the sectional size of the groove itself and the optical fibres are disposed loosely and can freely move within the grooves.

Another optical fibre cable is described in an article issued in the "International Wire & Cable Symposium Proceedings", 1986, by Nippon Telegraph and Telephone Corporation, pages 17 to 23.

In this cable several optical fibre ribbons are introduced into each helical groove so that they appear radially superposed to one another. The ribbons are substantially in tight relationship with respect to one another and are kept to the bottom of the helical grooves by slightly spring tensioning the ribbons.

Another cable with ribbon optical fibres is described in the European Patent Application No. 88102752.8 filed on Feb. 24, 1988; in this application intervals are given within which determined size ratios between each groove and the ribbons housed therein must be included.

If these dimensional ratio values are respected an uneven distribution of the ribbons is prevented, the transmissive and mechanical strength features thereof being therefore enhanced.

Optical fibre ribbons are described for example in the European Patent Application No. 86301846.1, wherein ribbons formed with several optical fibres are shown in which each fibre is provided with a protection sheath made of synthetic resins and the fibres are held together parallel to each other by a further sheath of synthetic resin; also described in this application is the technique for the manufacture of same.

In the European Patent Application No. 89202178 a process for the production of optical fibre ribbons is disclosed and some mechanical features of the material composing them are also described.

In accordance with the present invention it has been found that by applying a longitudinal tension of predetermined value to the mutually superposed ribbons in each groove, which tension has, for each ribbon, a greater value than the longitudinal tension applied to the ribbon radially superposed to the preceding one, the generation of microbendings on the optical fibre is prevented (which would give rise to undesired signal losses) even when the cable is submitted to thermal expansions or contractions of great amount.

The present invention relates to an optical fibre telecommunications cable comprising at least a first and a second ribbon of optical fibres, each provided with at least a primary layered coating comprising a first layer, in contact with the optical fibre, having a lower modulus of elasticity than a second layer external thereto, a housing structure forming at least a closed housing for said ribbons, extending in a helical manner along the groove axis and closed to the outside by a wall, in which the ribbons are radially superposed, and a pulling element, characterized in that said first ribbon is located in the housing so that it may exert a first pressure on the bottom thereof at a temperature of 20° C., and said second ribbon is located in the housing so that it may exert a second pressure lower than the first pressure on said first ribbon or on the radially underlying ribbon, the value of said first pressure and the ratio between said second pressure and said first pressure being such that an important radial travel of both ribbons to the outside of the housing is prevented correspondingly to a temperature decrease as far as a predetermined value, and respectively, that said first ribbon is prevented from moving away from the housing bottom by a distance greater than the moving-away distance covered by the second ribbon.

Preferably said predetermined temperature value ranges between −40° and 0° C.

In keeping with one aspect of the invention, it relates to a cable, as previously stated, in which at a temperature of 20° C. the longitudinal tension value in at least the radially innermost ribbon in said housing is lower than or equal to a value that becomes zero, due to the thermal contraction of the core, at the temperature corresponding to an increment of the modulus of elasticity of said first layer beyond a predetermined value, preferably lower than or equal to 50 MPa.

In keeping with a second aspect of the invention, it relates to a cable in which the elastic tension of the radially innermost ribbon in each housing has such a value that it corresponds to a contact of said ribbon with said outer wall to the same temperature as the minimum operating temperature provided for the cable or to a lower temperature.

Preferably, in a cable of the above described type the value of the longitudinal tension applied to the radially innermost ribbon in each housing is lower than a value that becomes zero, due to the thermal contraction of the core, to the temperature corresponding to the decrease under 10 of the ratio between the moduli of elasticity of said second and first layers of the fibre primary coating.

In keeping with another aspect of the invention, the elastic longitudinal tension applied to each of said ribbons is provided to be stepwise decreasing from the innermost to the outermost ribbons.

In particular said elastic longitudinal tension in each of said ribbons is in the range of 15 g to 150 g for each optical fibre present in each ribbon, at a temperature of 20° C.

In keeping with another aspect, the value of the elastic elongation existing in each ribbon by effect of the applied tension is included between 0.2 per thousand and 1.8 per thousand, at a temperature of 20° C.

In greater detail, said tension applied to each of said ribbons corresponds to a difference in the elastic elongation between one ribbon and the ribbon radially superposed thereto included between 0.05 per thousand and 0.4 per thousand, at a temperature of 20° C.

Preferably the tension reduction to zero at least in the radially outermost ribbon due to the thermal contraction of the core occurs at a temperature lower than or equal to the minimum operating temperature provided for the cable.

In a preferred embodiment, in a cable in accordance with the present invention the space existing between the radially outermost ribbon and said outer wall is lower than 1.5 times the ribbon thickness.

Preferably the helix pitch in the housings is in the range of 200 mm to 1000 mm.

In keeping with a further aspect thereof, it is an object of the present invention an optical fibre telecommunications cable comprising:
- a cylindrical core provided on the outer surface thereof with at least a groove extending in a helical manner around the cable axis;
- two or more ribbons radially superposed within at least one of said grooves, each of said ribbons comprising a plurality of optical fibres disposed in side by side relation, each fibre being covered with a primary layered coating in which a first layer directly in contact with the fibre has a modulus of elasticity lower than a second layer external thereto, said fibres being further covered with a common coating,
- an outer wall defining, in cooperation with said grooves, corresponding closed housings in which said optical fibre ribbons are located,
- a pulling element, characterized in that said ribbons are in a state of longitudinal elastic tension, the tension present in the innermost ribbon in contact with the respective groove bottom being greater than the longitudinal tension present in the outermost ribbon facing said outer wall.

Preferably the diameter of said cylindrical core is in the range of 4 mm to 20 mm.

In a preferred embodiment the cylindrical core has an inner strength member coaxial therewith.

More preferably, the inner strength member of the cylindrical grooved core is made of fibre-reinforced plastic material.

According to a preferred embodiment the pulling element is disposed at the outside of the grooved core.

More preferably the pulling element is geometrically de-coupled from the core.

In a preferred embodiment the pulling element is formed with filiform cordlike elements made of a tension-resisting material.

In keeping with a still further aspect thereof, the present invention relates to a process to make a grooved-core cable for ribbon optical fibres comprising the steps of:
- forming a cylindrical core provided with one or more grooves extending in a helical manner along its axis,
- keeping said grooved core in an extended condition in a predetermined elastic tension state,
- putting at least a pair of ribbons in at least one of said grooves in a radially superposed relation, each of said ribbons comprising a plurality of optical fibres each having a primary layered coating comprising one layer in contact with the optical fibre and a second layer external to said first layer, and a secondary coating common to said optical fibres forming one ribbon, the modulus of elasticity of said first layer being lower than the modulus of elasticity of said second layer,
- applying an outer wall around said cylindrical core, which wall, in cooperation with said grooves, defines corresponding closed housings in which said optical fibre ribbons are located,
- applying a pulling element to said core, characterized in that during the step in which the ribbons are put into the grooves, the ribbons themselves are kept in an elastic longitudinal tension state giving rise to an elastic deformation in the ribbons substantially greater than that of the grooved core, said longitudinal tension applied to each ribbon being greater than the longitudinal tension applied to the ribbon radially external to the former.

Preferably, in the above described process, said elastic longitudinal tension applied to each of said ribbons is included between 15 g and 150 g for each optical fibre present in each of said ribbons at a temperature of 20° C.; the value of the percent elongation produced on each ribbon by effect of the applied tension is comprised between 0.2 per thousand and 1.8 per thousand at a temperature of 20° C.

In one embodiment of the above process, the tension applied to each of said ribbons corresponds to a variation in the elongation between one ribbon and the ribbon radially overlying it in the range of 0.05 per thousand to 0.4 per thousand, at a temperature of 20° C.

In particular, during the step in which the ribbons are put into said grooves, said cylindrical core is submitted to a longitudinal pulling action causing an elongation of said core not higher than one per thousand, at a temperature of 20° C. Preferably, the core elongation is of the elastic type.

In a preferred embodiment of the process of the invention, the cylindrical-core formation step comprises the extrusion moulding of the core coaxially about an inner cylindrical strength member.

In the above preferred embodiment, still preferentially the inner cylindrical strength member is made of a fibre-reinforced plastic material.

In addition, in a preferred embodiment of the process of the invention, the application of the pulling element to said core comprises the step of disposing an armouring of pull-resisting fibres around said outer wall.

Further details will become more apparent from the following description given with reference to the accompanying drawings, in which:

FIG. 1 is a perspective view of an optical fibre ribbon in which the fibre coatings are stepwise interrupted;

FIG. 2 is a cross sectional view of a ribbon optical fibre cable in accordance with the present invention;

FIG. 3 is a perspective view of a core portion of the cable shown in FIG. 2;

Figure 4:
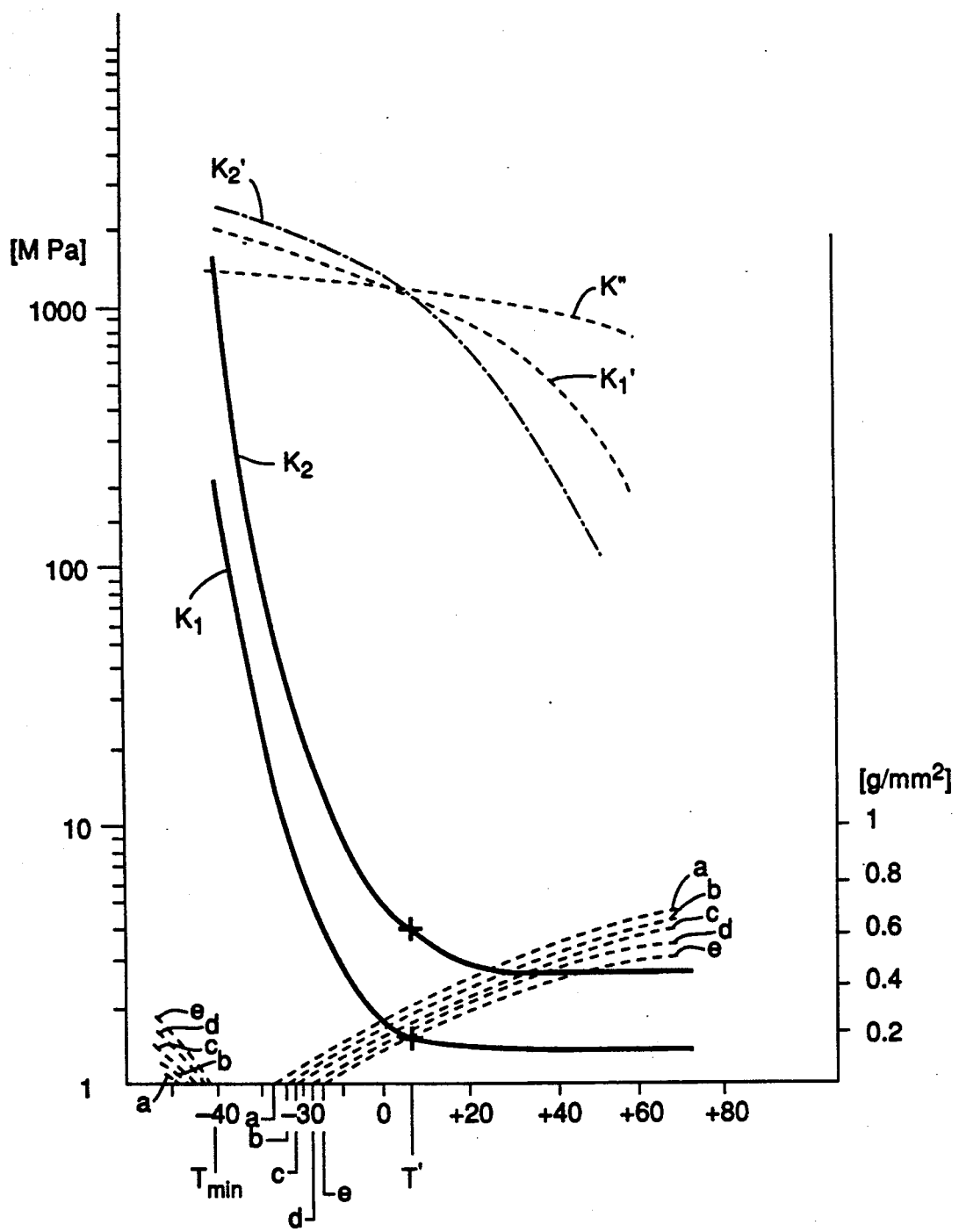
FIG. 4 is a diagram showing the variation in the moduli of elasticity of the coatings of the optical fibre ribbons, as well as the side pressures acting on the ribbons disposed in a cable in accordance with the invention, depending upon temperature.

As shown in FIG. 1, an optical fibre ribbon 1 is formed with several optical fibres 2, four for example, provided with polymeric coatings, substantially consisting of a primary layered coating 3 associated with each individual fibre 2, and a common coating 4 external to the primary layered coating 3, enclosing all optical fibres 2 belonging to the same ribbon 1 and holding them together.

The primary coating 3 of each fibre 2 in turn comprises one layer 5 in direct contact with the fibre and a second layer 6 applied to the first layer 5 and surrounding it. The modulus of elasticity of the material selected for the first layer 5 is lower than the modulus of elasticity of the material used for the second layer 6 of the primary coating 3; the modulus of elasticity of the common coating usually is of a value similar to that of the second layer 6 in the primary coating.

The materials and features of the fibre coatings for the formation of ribbons of the above type are known in the field and therefore will not be further described; for example the materials of the primary and common coatings are formed with synthetic thermosetting resins such as epoxi-acrylates, polyurethane acrylates, acrylated polyesters, acrylated silicones or mixtures thereof and the like having the appropriate characteristics.

Optical fibre ribbons adapted for use in cables in accordance with the invention can for example have a width of about 1.2 mm and a thickness of about 0.4 mm in the case of four-fibre ribbons.

Shown in FIG. 2 is a preferred embodiment of a cable of the invention housing the above described optical fibre ribbons.

As shown in FIG. 2, the cable 7 is comprised of a cylindrical strength member 8 formed with fibreglass-reinforced plastics and surrounded by a cylindrical core 9 of polymeric material, preferably made of polyethylene or polypropylene and having a diameter in the range of 4 mm to 20 mm.

The cylindrical core 9 is provided, on the outer surface thereof, with five parallel grooves 10 extending in a helical manner along the core axis.

Housed in each of the grooves 10, radially superposed with respect to each other, are several optical fibre ribbons 1, five in the embodiment shown.

In particular, there is one optical fibre ribbon 1a in contact with the groove 10 bottom and a second ribbon 1e facing the external part of the groove. In this example intermediate ribbons 1b, 1c, 1d are interposed between the first and second ribbons 1a and 1e, which involves the presence of a total amount of five ribbons 1a, 1b, 1c, 1d and 1e disposed in radially superposed relation.

Ribbons 1a, 1b, 1c, 1d and 1e housed in each groove 10 are submitted to a longitudinal tension state; this tension, at the room temperature of 20° C. has a value in the range of 60 g to 600 g per ribbon, respectively corresponding to a value of 15 g to 150 g for each fibre 2 present in each ribbon. This tension applied to optical fibre ribbons of the above described type, corresponds to an elongation of the ribbons included between 0.2 per thousand and 1.8 per thousand.

In addition, the longitudinal tension applied to one ribbon 1a, 1b, 1c, 1d and 1e is greater than the longitudinal tension applied to the ribbon that is radially superposed to the former; in particular, the detectable difference in the elastic elongation between two adjacent ribbons 1a, 1b, 1c, 1d, 1e at the temperature of 20° C. has a value ranging between 0.05 per thousand and 0.4 per thousand.

In a cable as described by way of example, the longitudinal tensions applied to the ribbons 1a, 1b, 1c, 1d and 1e which are superposed in succession starting from the corresponding groove 10 bottom are equal to 330 g, 300 g, 270 g, 240 g and 210 g; this cable is adapted to operate as far as a minimum temperature approximately of −40° C. For operating at a higher minimum temperature, just as an indication in the order of −20° C., a cable of the above structure has been provided in which the longitudinal tensions of the ribbons are equal to 220 g, 200 g, 180 g, 160 g and 140 g.

The strength member 8 made of fibreglass-reinforced plastics has a diameter equal to 4.0 mm, whereas the core 9 made of polypropylene, has a diameter equal to 10 mm. The core 9 is provided with five helical grooves 10; for both the above cables the helical pitch of the grooves is arranged to be in the order of 350 mm.

Each groove 10 has a width of about 1.60 mm and a maximum depth of approximately 2.2 mm and accommodates five four-optical fibre ribbons of the above described type having a width of 1.2 mm and a thickness of 0.4 mm.

Disposed around said cylindrical core 9 is an outer wall 11 defining, in cooperation with said grooves 10, corresponding closed housings in which the optical fibre ribbons 1a, 1b, 1c, 1d, 1e are located.

The wall 11 is formed with a layer of synthetic tapes 12; in the example shown an inner 0.8 mm thick sheath 13, made of polyurethane or similar elastomeric material is provided externally of the tapes 12 and it is surrounded by a pulling armouring 14 consisting of two rings of aramidic fibres each formed with 14 yarns and wound in opposite helical; the stiffness of the armouring, that is the product of its resistant area by its modulus of elasticity is equal to 212,000 kg.

The aramidic fibre armouring has a stiffness which is about three times the stiffness of the grooved core, that is it supports at least 75% of the axial tensile load that may be applied to the cable, for example during the laying step. It is to be noted that the strength contributions offered by the remaining parts of the cable are neglible.

Provided externally to the armouring is the moisture barrier made of corrugated steel 15 and the outer sheath 16 made of polyethylene or the like, as far as an overall diameter of 19.5 mm is reached.

The process to make the ribbon optical fibre cable is as follows.

The cylindrical core 9 provided with the helical parallel grooves 10 is extruded over a cylindrical strength member 8.

Subsequently the cylindrical core 9 is submitted to a longitudinal pulling action of a limited value that is included between 1 kg and 7 kg in order to extend the core itself thereby bringing about a slight elongation of the same, of the elastic type and not higher than 1 per thousand.

By way of example, the longitudinal tension to which the cylindrical core is submitted can be of about 4 kg to which an elongation of the core itself substantially in the order of 0.06 per thousand corresponds.

While the core 9 is being held in this condition the ribbons 1a, 1b, 1c, 1d and 1e are disposed in a radially superposed relation in each of the grooves 10.

As is clear from the above description, the individual ribbons 1a, 1b, 1c, 1d, 1e are introduced into the grooves 10 by the application thereto of elastic tensioning conditions of a stepwise decreasing amount so as to give rise to the cited elastic tension values in the finished cable.

After optionally introducing a filter in the fluid state into the grooves 10, such as buffer grease having hydrogen absorbing properties, a layer of synthetic tapes 12 forming the outer wall 11 is put around the core 9 therby defining, in cooperation with the grooves 10, the closed chambers in which the ribbons are contained.

In order to complete the cable structure, in the preferred embodiment shown an inner sheath 13 of elastomeric material is then put in place and a tight armouring 14 of pull resisting fibres is disposed around it; subsequently two or more layers forming a mositure barrier and a covering are disposed around the armouring 14, said layers comprising a moisture barrier 15 of corrugated steel and an outer sheath 16 of elastomeric material.

The above described cable is adpated for use between a minimum operating temperature in the range of −20° C. to −40° C. and a maximum operating temperature in the range of +50° C. to +80° C.

This application range is made possible by the structure and application conditions of the fibre ribbons in the cable.

Ribbons 1a, 1b, 1c, 1d, 1e, as viewed from FIG. 3 where for the sake of clarity only one groove 10 is shown in full, are accommodated within the grooves 10 which have a helical profile. As a reslut, the smaller is the helix pitch P described by the grooves, the greater the bending to which the ribbons are submitted, the outer diameter of the core 9 being equal.

Said bending in combination with the elastic longitudinal tension proper to the ribbons, results in a side pressure towards the groove bottom as regards the innermost ribbon 1a and towards the underlying ribbon as regards the other overlying ribbons.

The value of this pressure is proportional to the longitudinal tension and bending undergone by the ribbons.

Preferably, the pitch of each helical groove 10 ranges between 200 mm and 1000 mm and takes into account two opposite requirements, i.e. that of maintaining the bending imposed to the ribbons within given limits and that of reducing the influence exerted on the ribbons by the thermal expansions and contractions of the cable.

In fact when the cable is submitteed to temperature variations it expends and contracts in a congruent manner; the coefficient of thermal expansion of the overall structure, depending on the coefficient of thermal expansion of the individual materials forming it and the respective stiffnesses, is remarkably greater than the coefficient of thermal expansion of the ribbons 1a, 1b, 1c, 1d and 1e, substantially corresponding to that of the glass.

Therefore temperature variations in the cable result in different size variations of the cable structure and in particular, due to the congruence of the structure, of the core 9 structure with respect to the ribbons.

As a result, each temperature variation brings about a variation in the elastic tensioning state of the ribbons 1a, 1b, 1c, 1d, 1e and therefore in the specific pressure according to which the ribbons are pressed against the inner groove walls.

In the diagram of FIG. 4 curves denoted by a, b, c, d, e, represent the pressure variations acting on ribbons 1a, 1b, 1c, 1d, 1e, respectively, due to the thermal expansion or contraction undergone by the central core 3 upon temperature variations. The side pressure values acting on the ribbons can be detached by the g/mm² scale reproduced on the right-hand ordinates in the diagram.

When the temperature falls beyond a given value, following the core 9 contraction, the individual ribbons 1a, 1b, 1c, 1d, 1e one after the other starting from the outermost ribbon 1e reduce their tensioning to zero and, as a result, the corresponding side pressure value.

In the diagram shown in FIG. 4 the temperature values to which the reduction to zero of the side pressure of the individual ribbons 1a, 1b, 1c, 1d, 1e corresponds have been denoted by Ta, Tb, Tc, Td, Te, respectively.

The presence of a possible radial space in the grooves 10 between the outermost ribbon 1a and the wall 11, causes the side pressure on the ribbons 1a, 1b, 1c, 1d, 1e to be of zero value over a certain temperature interval dependent on said space, under said values Ta, Tb, Tc, Td, Te.

In particular, in order to keep the radial bulkiness of the cable within given limits, this radial space in the grooves is preferebly maintained within the minimum value which, taking into account the manufacture conditions, excludes the possibility that the outermost ribbon should project from the cylindrical surface of the core 9. In fact, in this case the ribbon would be exposed to mechanical stresses transmitted from the outside, particularly in the form of radial compressions, which would lead to unacceptable attenuations in the fibre signals.

Preferably the value of the radial space is provided to be lower than 1.5 times the thickness of a ribbon and in general, more preferably, this space is maintained within the minimum value that can be achieved in connection with the adopted materials and working techniques and that at the same time will be consistent with the above requirements.

If this space is present, in a certain temperature interval a size variation of the grooved core 9 is likely to be present between the condition in which the outer ribbon 1a tension is reduced to zero and the condition in which the ribbon 1e is brought into contact with the outer wall 11; at said possible temperature interval the side pressure acting on said ribbon is substantially zero and the ribbon position in the groove is undetermined.

On a further temperature reduction in the cable the side pressure on the individual ribbons 1a, 1b, 1c, 1d, 1e increases again starting from the outermost ribbon 1e. This new pressure increase is caused by the fact that the ribbons 1a, 1b, 1c, 1d, 1e initially compressed towards the groove 10 bottom, are brought into contact with the outer wall 11 formed with the layer of tapes 12 and are radially thrusted against it since they tend to move away from the core 9 centre by effect of their being thermally contracted to a lower degree relative to the core 9.

On selecting the longitudinal tensioning to be given to the individual ribbons 1a, 1b, 1c, 1d, 1e, due attention has been paid to the fact that on varying the temperature, within the range of the use temperatures currently provided for the cable, a corresponding variation in the moduli of elasticity of the materials of the first layer 5 and second layer 6 in the ribbon primary coating 3 occurs.

In fact it has been observed that in accordance with the present invention, in the temperature range within which the operating temperatures of the cable fall, that is, by way of example only, between −40° C. and +80° C., a temperature decrease brings about a gradual increase, with a slight sloping, of the modulus of elasticity K' of the material used for the second coating layer. This increase of the modulus of elasticity is indicated by curves $K_1'$ and $K_2'$ in FIG. 4 reference being made to two possible materials to be used for this layer.

The modulus of elasticity K of the materials of possible use for the first layer 5 as shown by curves $K_1$, $K_2$ relating to two of such materials, on the contrary, exhibits an increase having a low gradient as far as temperature decreases beyond a given value T' are reached; when temperatures are lower than T', the modulus of elasticity K of the first layer 5 grows in a very marked manner.

The temperature value T' is generally comprised between $+10°$ C. and $-30°$ C. The increase of the modulus of elasticity of the common coating 4 on temperature decreasing is moderate and has a substantially constant sloping as shown by curve K" in FIG. 4 relating to a material adapted for the purpose; the material of the common coating has a modulus substantially of the same value than the second layer 6. The values of said moduli of elasticity in MPa can be detected from the logarithmic scale reproduced on the left-hand ordinates in FIG. 4.

It has been found that when the cable operates under relatively high temperature conditions, the primary coating 3 and the common coating 4 are adapted to efficiently protect the optical fibres 2 from microbending phenomena and from the consequent signal attenuations, due to localised pressures transmitted to the ribbons 1a, 1b, 1c, 1d, 1e by effect of micro-asperities present on the inner walls of the grooves 10 or on the surface of the adjacent ribbons.

Actually, at temperatures higher than the room temperature of 20° C., the inner layer 5 of the primary coating 3 has a low modulus of elasticity, in the order of $1.5+3$ MPa depending upon the type of material used, which practically remains constant in the interval between $+10°$ and $+60°$ C.; this low modulus enables outer stresses to be avoided and in particular prevents the side pressure on the ribbons from giving rise to microbendings in the optical fibres 2.

At temperatures higher than room temperature therefore it is possible to accept a relatively high side pressure on the ribbons without the occurrence of an important attenuation in the transmitted signals; as a consequence a thermal expansion of the cable and by congruence of the core 9 can be permitted until temperatures of 50° C. to 80° C.

At lower temperatures, until the second layer 6 and common coating 4 have a relatively high modulus, in the order of 500 to 1100 MPa, while the first layer 5 is still keeping a low modulus of elasticity, preferably lower than 5 MPa, the layer 6 and coating 4 substantially behave like an armour withstanding said localised pressures, while the first layer 5, due to its moderate modulus of elasticity, lends itself to an elastic yielding in order to absorb the localised deformations that the second layer 6 and common coating 4 may be lead to undergo, without microbendings being transmitted to the fibres 2.

In the presence of an increase in the modulus of elasticity of the first layer, a state of tension and a consequent side pressure can be held in the ribbons the value of which progressively decreases as far as the ratio between the moduli of elasticity of the second layer 6 (or the common coating) and the first layer 5 keeps a value higher than 10 and preferably higher than 50.

At lower temperatures, on the contrary, the capability of the primary and secondary layers to efficiently perform their protection functions is greatly reduced.

This is due to the strong increase in the modulus of elasticity of the first layer 5 and the consequent decreasing under a value that has been identified as critical of the ratio existing between the values of the moduli of elasticity of the second and first layers 6 and 5.

In fact when the ratio between said moduli goes under 10, or preferably under 50, if the ribbons 1a, 1b, 1c, 1d, 1e should be submitted to important side pressures, the micro-asperities present on the surfaces with which the ribbons are brought into contact, such as grooves 10, wall 11 or adjacent ribbons, would transmit microbendings that would reach the optical fibres 2, thereby bringing about signal attenuations.

In accordance with the present invention, tensionings of ribbons 1a, 1b, 1c, 1d, 1e at the temperature of 20° C. are therefore selected so that the temperature Ta at which the elastic tension becomes zero at least in the radially innermost ribbon 1a may enable the ratio between the modulus of elasticity K' of the first layer 5 not to be lower than 10 and preferably not to be lower than 50.

For the purpose of selecting the tensionings of ribbons 1a, 1b, 1c, 1d, 1e, it has been also considered the condition according to which, correspondingly to the temperature Ta at which the reduction to zero of the elastic tension at least in the radially innermost ribbon 1a takes place, the modulus of elasticity of the first layer 5 is not higher than 50 MPa.

The adoption of the above expedients (preferably of the strictest one of the expedients in connection with the materials used) avoids a side pressure being applied to the fibre as a result of the tension applied to the ribbons, when the fibre is in a condition of weak protection.

By the application of decreasing tension to the ribbons 1a, 1b, 1c, 1d, 1e, in particular from the innermost ribbon 1a to the outermost one 1e, the occurrence of compression effects on the inner ribbons by the outer ribbons when the operating temperature goes under the value Ta is avoided. In fact, considering only the first radially innermost ribbon 1a and the second radially outermost ribbon 1e for the sake of simplicity, one can see that the first ribbon 1a is accommodated in the groove 10 so as to exert a first pressure on the bottom thereof at a temperature of 20° C., and the second ribbon 1e is laid in the groove 10 so that it may exert a second pressure lower than the first one on said first ribbon 1a or on the ribbon radially more internal relative to it.

Said first pressure and the ratio between the second and first pressures are of such a value that said first ribbon 1a is prevented from tending to move away from the groove 10 bottom by a greater distance than the moving-away distance of the second ribbon 1e.

In addition it is noted that the radially decreasing intensity of the tensioning of ribbons 1a, 1b, 1c, 1d, 1e, makes it possible to adopt pretensioning of a relatively high value without running the risk of compressing the innermost ribbons too much against the inner walls of grooves 10 at high temperature.

The minimum longitudinal tension value dictated to the ribbons at 20° C. (15 g/fibre) is selected for the purpose of avoiding the occurrence of an important increase in the modulus of elasticity of the first layer 5 before the occurrence of the reduction to zero or at least an important reduction in the longitudinal tensioning of the individual ribbons 1a, 1b, 1c, 1d, 1e, and therefore in the side pressure corresponding thereto, by effect of the thermal contraction of the core 9.

Preferably the tensioning values of ribbons 1a, 1b, 1c, 1d, 1e are so selected that the tension reduction to zero at least in the innermost ribbon 1a takes place at a temperature value lower than or equal to the minimum operating temperature of the cable 1; thus ribbons 1a, 1b, 1c, 1d are prevented from undergoing an important radial travel so as to leave the close-lying position within the respective groove at a low temperature.

Within the scope of the present invention it is however also included the possibility of extending the minimum limit of the operating temperature of the cable by utilising the possible radial space between the ribbons and the wall 11.

Under these conditions the value of the elastic tension imparted to the radially outermost ribbon 1e in combination with said possible radial space existing between the ribbon itself and said outer wall 11, can be of such an extent that it corresponds to a contact of the ribbon 1e with the outer wall 11 at a temperature lower than or equal to the minimum operating temperature $T_{min}$ provided for the cable.

As a result of this, all possibilities that within the range of use of the cable a side pressure may occur on the ribbon, and in particular on the outermost ribbon 1e are excluded when the protective fibre coating is in the least favourable conditions for exerting its armour function as above described.

In particular, the value of said first pressure and the ratio between said second pressure and the first pressure are of such an extent that an important radial travel of the ribbons 1a, 1b, 1c, 1d, 1e towards the outside of the groove 10 is excluded in register with a temperature decrease until a predetermined value at least lower than or equal to 0° C. and preferably included between −40° C. and 0° C.; as an indication only, an important radial travel is a travel 50% greater than the space, if any, existing in the grooves.

The previously specified maximum value of the longitudinal ribbon extension at 20° C. (150 g/fibre) is provided for the purpose of avoiding too great a tension in the ribbons taking place at the maximum operating temperature of the cable, due to the thermal expansion undergone by the core 9, which great tension would cause attenuations in the fibres, in spite of the damping effect performed by the inner layer of the primary coating.

By way of example only, the above specified maximum tension value is permissible for a cable in which the provided maximum operating temperature reaches 80° C.

Based on particular requirements other cable structures can also be provided, particularly adapted to give the cable the strength requirements needed for the specific applications.

A cable in accordance with the invention, in its general form comprises several optical conductors consisting of optical fibres provided with a primary layered coating, preferably gathered to form optical fibre ribbons, a housing structure for said conductors, for example comprising a grooved core, adapted to keep them confined in a given position and to protect the conductors against loads radial or transverse to the cable, and a pulling element, consisting for example of the peripheral armouring made of aramidic fibres adapted to withstand the tensile loads applied to the cable, for example during the laying thereof.

In accordance with the present invention the longitudinal pulling efforts are absorbed in the cable by the peripheral armouring of aramidic fibres, geometrically de-coupled from the grooved core; the size variations in the longitudinal direction, mainly of thermal nature, are controlled by the strength member provided in the grooved core, which strength member does not help to an important degree (for example greater than 20 to 30%) in the pulling resistance of the cable (which is roughly calculated as the sum of the resistances of the aramidic armouring and the strength member) in the presence of optical fibre ribbons contained in said core in operational combination therewith, but is adapted to improve the cable performance in the presence of size variations, in particular at low operating temperatures.

Provision may be made for other elements, such as sheaths and the like, depending upon the specific application requirements of the cable.

For example, for applications in which a high tensile strength is necessary, the size ratios between the grooved core and the aramidic armouring can be conveniently modified, in order to make the armouring still more adapted to withstand the pulling action to which the cable can be submitted.

The housing structure of the conductors is generally responsible for a prevailing part of the cable size variations of thermal nature.

In fact this structure usually exhibits a relatively high section and its thermal contraction in combination with its stiffness influences the cable contraction as a whole.

Under these conditions it is therefore convenient that this housing structure be geometrically separated from the cable pulling element in order to enable the selection of more appropriate sizes and materials for said structure from the point of view of its thermal behaviour.

In particular for the purpose it is convenient that the groove core should possess a strength member having a low coefficient of thermal expansion and contraction and high stiffness.

The embodiment of the invention is applicable to cables having different construction and use features but it is particularly appropriate in case of cables the structure of which is particularly subjected to thermal contraction and expansion phenomena, as in the case of a strength member of small diameter, made of fiberglass-reinforced resin and a core of plastic material; therefore above all in this particular case the invention enables the range of use temperatures to be extended without involving important signal attenuations in the fibres, while at the same time keeping the outer cable bulkiness within reduced limits.

Therefore the invention enables very reliable optical fibre cables to be accomplished which are exempt from signal attenuation phenomena even when the range of the operating temperatures is very high.

The relatively high tensioning imparted to ribbons 1a, 1b, 1c, 1d, 1e, in addition enables any risk of anomalous stresses on the optical fibres due to possible bending deformations imposed to the cable during the production and/or setting-up thereof to be efficiently eliminated, said deformations being for example due to a bad positioning of the ribbons as the latter are kept tight in the grooves.

To the ends of the present invention as it has been hereinbefore described, a leading role is played by the tensions of the ribbons in the grooves, whereas the possible excess space present in the grooves in the radial direction does not play a leading role.

Said excess space can be remarkably greater than the sum of the ribbon thicknesses (even twice), and in this case too the ribbons do not run the risk of taking a wrong positioning due to the space they have at their disposal.

For the above reason the same grooved core having particular size features can be used to obtain a cable adapted to accommodate a smaller or greater number of ribbons.

While the present invention has been described in detail with reference to a cable housing optical fibre ribbons in which the innermost layer of the fibre coating has a lower modulus of elasticity than the layer disposed external thereto, it also applies to cases in which the common ribbon coating or other coatings present in the ribbons are made of several layers.

In particular the above exposed concepts can apply to each case in which the optical fibre ribbons or even the individual optical fibres housed in a cable possess any layered coating providing an inner layer of lower modulus of elasticity than a layer external to the former, said layers being located in the cable in a predetermined elastic tension state.

It is understood that modifications and variations can be made to the invention as conceived, all of them falling within the scope of the inventive idea.

We claim:

1. An optical fibre telecommunications cable comprising a plurality of ribbons including at least a first and a second ribbon (1a, 1e) of optical fibres (2), each provided with at least a primary layered coating (3) comprising a first layer (5), in contact with the optical fibre, having a lower modulus of elasticity than a second layer (6) external thereto, a housing structure (9) having at least one groove (10) forming at least a closed housing (10) for said ribbons, said housing having a bottom and extending in a helical manner around the groove axis and being closed to the outside by a wall (11), in which the ribbons are radially superposed at different radial distances from said axis to provide a radially outermost second ribbon (1e) and a radially innermost first ribbon (1a), ribbons at radially longer distances from said axis overlying ribbons at radially smaller distances from said axis and ribbons at radially smaller distances from said axis underlying ribbons at radially longer distances from said axis, each of said ribbons being in elastic longitudinal tension so that overlying ribbons apply pressure to underlying ribbons, and a pulling element (14), characterized in that said first ribbon (1a) is located in the housing (10) so that it can exert a first pressure of a predetermined value on the said bottom of said housing at a temperature of 20° C., and said second ribbon (1e) is located in the housing so that it can exert a second pressure lower than the first pressure on said first ribbon (1a), said value of said first pressure and the ratio between said second pressure and said first pressure being such that an important radial travel of both ribbons to the outside (11) of the housing (10) is prevented with a temperature decrease up to a predetermined value, and respectively, that said first ribbon (1a) is prevented from radially moving away from the housing (10) bottom by a distance greater than the radial travel of said second ribbon (1e).

2. An optical fibre telecommunications cable according to claim 1, characterized in that said predetermined value of said temperature decrease is in the range from −40° to 0° C.

3. A cable according to claim 1, characterized in that at a temperature of 20° C. said longitudinal tension on at least said first ribbon (1a) in said housing (10) is lower than or equal to the value that becomes zero, due to the thermal contraction of the housing structure (9), at a temperature (Ta) corresponding to an increment of the modulus of elasticity of said first layer (5) beyond a predetermined value.

4. A cable according to claim 3, characterized in that said predetermined value of the increment of the modulus of elasticity of said first layer is lower than or equal to 50 MPa.

5. A cable according to claim 1, characterized in that the elastic longitudinal tension of the radially outermost ribbon (1e) in each housing (10) has such a value that it corresponds to a contact of said ribbon (1e) with said outer wall (11) at a temperature at least as low as the minimum operating temperature ($T_{min}$) for the cable.

6. A cable according to claim 1, characterized in that the value of the longitudinal tension applied to the radially innermost ribbon (1a) in each housing (10) is lower than a value that becomes zero, due to the thermal contraction of said housing structure (9), corresponding to the temperature (Ta) at which the decrease of the ratio between the moduli of elasticity of said second (6) and first (5) layers of the fibre primary coating (3) is less than 10.

7. A cable according to claim 1, characterized in that the elastic longitudinal tension applied to each of said ribbons (1a, 1b, 1c, 1d, 1e) is provided to be stepwise decreasing from the innermost to the outermost ribbons.

8. A cable according to claim 1, characterized in that said elastic longitudinal tension in each of said ribbons (1a, 1b, 1c, 1d, 1e) is in the range of 15 g to 150 g for each optical fibre (2) present in each ribbon, at a temperature of 20° C.

9. A cable according to claim 1, characterized in that the value of the elastic elongation existing in each ribbon (1a, 1b, 1c, 1d, 1e) by reason of the elastic longitudinal tension is included between 0.02 percent and 0.18 percent at a temperature of 20° C.

10. A cable according to claim 7, characterized in that said elastic longitudinal tension applied to each of said ribbons (1a, 1b, 1c, 1d, 1e) provides a difference in the elastic elongation between one ribbon and the ribbon radially superposed thereto between 0.005 percent and 0.04 percent, at a temperature of 20° C.

11. A cable according to claim 1, characterized in that the reduction of the elastic longitudinal tension to zero, at least in the radially outermost ribbon (1e), due to the thermal contraction of the housing structure (9) occurs at a temperature lower than or equal to the minimum operating temperature to which the cable is subjected.

12. A cable according to claim 1, characterized in that a space existing between the radially outermost ribbon (1e) and said outer wall (11) is lower than 1.5 times the ribbon thickness.

13. A cable according to claim 1, characterized in that the pitch of the housings (10) extending in a helical manner is in the range of 200 mm to 1000 mm.

14. An optical fibre telecommunications cable according to claim 1 wherein said housing structure comprises:
 a cylindrical core (9) provided on the outer surface thereof with said at least one groove (10) extending in a helical manner around the groove axis;
 characterized in that there are more than two said ribbons (1a, 1b, 1c, 1d, 1e) and the elastic longitudinal tension present in the innermost ribbon (1a) in contact with the respective housing bottom being greater than the elastic longitudinal tension present in the outermost ribbon (1e) facing said outer wall (11).

15. A cable according to claim 14, characterized in that the diameter of said cylindrical core (9) is in the range of 4 mm to 20 mm.

16. A cable according to claim 14, characterized in that the cylindrical core (9) has an inner strength member (8) coaxial therewith.

17. A cable according to claim 16, characterized in that the inner strength member (8) of the cylindrical grooved core (9) is made of fibre-reinforced plastic material.

18. A cable according to claim 14, characterized in that the pulling element (14) is disposed at the outside of the grooved core.

19. A cable according to claim 18, characterized in that the pulling element (14) is geometrically de-coupled from the core.

20. A cable according to claim 18, characterized in that the pulling element (14) is formed with filiform cordlike elements made of a tension-resisting material.

21. A process to make a grooved-core cable for ribbon optical fibres comprising the steps of:
forming a cylindrical core (9) provided with one or more grooves (10) extending in a helical manner along its axis,
keeping said core (9) in an extended condition in an predetermined elastic tension state to cause elongation of said core,
putting at least a pair of ribbons (1a, 1b, 1c, 1d, 1e) in at least one of said grooves (10) in a radialy superposed relation, each of said ribbons (1a, 1b, 1c, 1d, 1e) comprising a plurality of optical fibres (2) each having a primary layered coating comprising one layer (5) in contact with the optical fibre (2) and a second layer (6) external to said first layer (5), and a secondary coating (4) common to said optical fibres forming one ribbon (1), the modulus of elasticity of said first layer (5) being ower than the modulus of elasticity of said second layer (6),
applying an outer wall (11) around said cylindrical core (9), which wall (11), in cooperation with said grooves (10). defines corresponding closed housings in which said optical fibre ribbons (1a, 1b, 1c, 1d, 1e) are located,
applying a pulling element (14) to said core (9), characterized in that during the step in which the ribbons (1a, 1b, 1c, 1d, 1e) are put into the grooves (10) in superimposed relation with the ribbons at different radial distances from said axis of said core (9), the ribbons themselves are subjected to an elastic longitudinal tension giving rise to an elastic elongation of the ribbons substantially greater than that of the core (9), said elastic longitudinal tension applied to each ribbon (1a, 1b, 1c, 1d, 1e) at a smaller radial distance from said axis being greater than the longitudinal tension applied to the ribbon at a greater radial distance from said axis.

22. A process according to claim 21, characterized in that said elastic longitudinal tension applied to each of said ribbons (1a, 1b, 1c, 1d, 1e) is included between 15 g and 150 g for each optical fibre (2) present in each of said ribbons (1a, 1b, 1c, 1d, 1e) at a temperature of 20° C.

23. A process according to claim 21, characterized in that the value of the percent elastic elongation of each ribbon (1a, 1b, 1c, 1d, 1e) by reason of the elastic longitudinal tension to which they are subjected is comprised between 0.02 percent and 0.18 percent at a temperature of 20° C.

24. A process according to claim 21, characterized in that the tension to which each of said ribbons (1a, 1b, 1c, 1d, 1e) is subjected corresponds to a variation in the elongation between one ribbon (1a, 1b, 1c, 1d, 1e) and the ribbon at a greater radial distance from said axis is in the range of 0.005 percent to 0.04 percent, at a temperature of 20° C.

25. A process according to claim 21, characterized in that during the step in which the ribbons (1a, 1b, 1c, 1d, 1e) are put into said grooves (10), said cylindrical core (9) is submitted to a longitudinal pulling action causing an elongation of said core (9) not higher than 0.1 percent at a temperature of 20° C.

26. A process according to claim 25, characterized in that the core elongation is elastic elongation.

27. A process according to claim 21, characterized in that the forming of said cylindrical-core (9) comprises an extrusion moulding of the core axially about an inner cylindrical strength member (8).

28. A process according to claim 27, characterized in that the inner cylindrical strength member (8) is made of a fibre-reinforced plastic material.

29. A process according to claim 21, characterized in that the application of the pulling element (14) to said core (9) comprises the step of applying an armouring (14) of pull-resisting fibres around said outer wall (11).

* * * * *